ated Apr. 20, 1971

United States Patent

[11] 3,575,136

| [72] | Inventor | Paul Harder<br>Baselstrasse 62, 4142 Munchenstein, Switzerland |
|---|---|---|
| [21] | Appl. No. | 708,065 |
| [22] | Filed | Feb. 26, 1968 |
| [45] | Patented | Apr. 20, 1971 |
| [32] | Priority | Mar. 11, 1967 |
| [33] | | Switzerland |
| [31] | | 3556 |

[54] METHOD AND AN INSTALLATION FOR TREATING CHIP WOOD BOARDS AND CHIP WOOD BOARDS TREATED ACCORDING TO THIS METHOD
2 Claims, 3 Drawing Figs.

[52] U.S. Cl. .................................................. 118/410, 21/71
[51] Int. Cl. .................................................. B05c 3/20
[50] Field of Search .......................................... 117/117, 43; 118/410, 411; 21/71, 72, 73, 63, 68

[56] References Cited
UNITED STATES PATENTS

| 2,101,854 | 12/1937 | Haunz | 118/410X |
| 644,252 | 2/1900 | Lebioda | 21/72 |
| 807,411 | 12/1905 | Willner | 21/71 |
| 2,287,403 | 6/1942 | Young | 117/117X |
| 3,071,106 | 1/1963 | Burelbach | 118/410X |

FOREIGN PATENTS
| 371,960 | 2/1907 | France | 21/71 |

Primary Examiner—John P. McIntosh
Attorney—Imirie & Smiley

ABSTRACT: Certain areas of chip wood board are increased in density by means of an injection device having a plunger therein and an outlet. A circumferentially closed relatively thin wall is supported by the device adjacent the outlet and is pressed into the board for limiting the area of the board to be treated. A density-increasing material is then injected and guided by the wall into the board. Holding members engage opposite surfaces of the board, and a clamping plate holds the board in position relative to the injection device.

PATENTED APR 20 1971 3,575,136
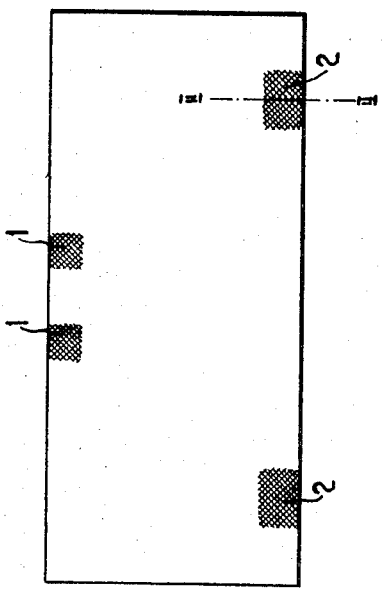
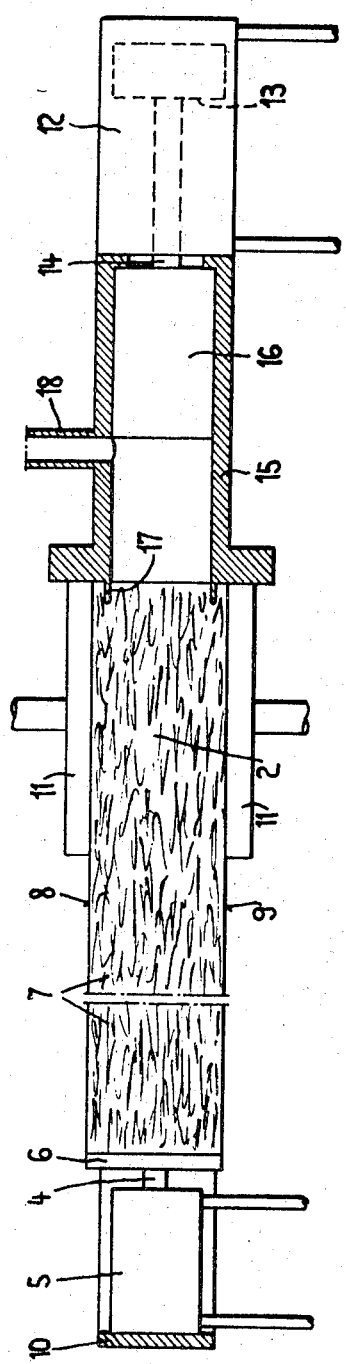
INVENTOR
Paul Harder
BY Imirie & Smiley
ATTYS.

METHOD AND AN INSTALLATION FOR TREATING CHIP WOOD BOARDS AND CHIP WOOD BOARDS TREATED ACCORDING TO THIS METHOD

Hitherto, screwing or otherwise fastening fittings, mountings or the like to the mostly porous chip wood boards was only possible when solid wood laths or strips were glued to the edges or the borders of these chip boards. This procedure became especially necessary in the case of lighter chipboards having better properties against warping or buckling than heavier, i.e. more compact or compressed chipboards of high density. Furthermore, it is easier to the joiner or carpenter to handle and transport a door of, for instance, 20 kg. than one of 40 kg. Glueing solid wood strips around the edges or borders of a chipboard requires time-consuming labor and costly solid timber. Moreover, strips of solid timber leave behind visible traces on the surface, i.e., on the veneer of the chipboard. Without solid timber strips or laths or without locally glued-in solid timber pieces it was impossible up till now to safely fix fittings, screws or the like to chip wood boards, because these boards are in the median range of their thickness porous and filling badly glued so that they cannot offer sufficient support or hold to screws and the like.

It had also been tried to inject adhesive substance into the rough-drilled screw holes. Though the screws were thereby surrounded by glue, this was of no advantage because the entirety consisting of screw and glue did not find sufficient hold in the porous layers of the chipboards.

In another prior method it was tried during manufacture of the boards or plates to provide limited regions of increased density. When manufacturing these plates, especially molded bodies of varying thickness throughout their square dimensions, a loose fibrous mass consisting of wood waste was spread out in varying thickness, so that by the subsequent pressing of this loose mass, boards of unequal thickness were obtained, which, at the places suffering the greatest external force had the highest density and at the places suffering the smallest load had the smallest density. In this manufacturing method, great quantities of binding agent have preferably been added to the still loose mass at the places to be given the highest density. However, it was difficult and time-consuming to determine the thickness of the loose layer to be deposited to obtain the desired higher hardness or density at certain places of the board to be manufactured. After manufacture of such a board, its special applicability of the board is definitely determined, i.e., already before the manufacture of the board, position, shape and largeness of the places to be highly compressed must be determined. At places where the density is to be especially increased by adding larger quantities of binding agent to the still loose mass, harmful stresses result during manufacture, causing warping, rupture etc. of the board.

The present invention aims to remedy of the above-described disadvantages. For that purpose the method according to the invention is characterized in that the already manufactured chip wood board is given a higher density in at least one place of the board by pressing-in a filling material, such as, for instance, a binding agent.

Therefore, due to the invention, completed, industrially manufactured chip wood boards of any commercial size may be taken from a stock or deposit and increasing the density can be made on such boards according to actual requirements at the places desired of the boards. In other words, chip wood boards are used, during whose manufacture no care whatsoever had to be taken as to a special degree of density at certain places, so that this manufacture had not been injured by special measures for increasing the density on certain places of the board. The method according to the invention is preferably used for planar chip wood boards of uniform thickness and of commercial size, which can be subdivided by the user or purchaser into the desired sizes.

As tests have proved, the local increase of density according to the invention in a range which, for instance, allows the making of screw holes, for driving-in screws, or providing slots and feathers for groove-and-tongue joints, etc. to give the board, at the desired places, a strength and density equally efficient as that of solid timber, for instance a resistance against pulling-out of screws which corresponds to that of solid timber. An additional advantage even over solid timber resides in the fact that screws do not loosen in the course of time as is often the case in solid timber due to a subsequent drying of the latter.

As filling material preferably binding agents are used, such as animal and vegetable glues, synthetic-resin cements, thermoplastic synthetic-resin or synthetic resin capable of being poured. Among thermoplastic synthetic-resins there may be used, for instance, polystyrene, polyamide, polyethylene and these agents may be heated to 200° to 250° C. before they are pressed into the chipboard, so that they will afterwards harden in the cold chipboard.

The apparatus for carrying out the method according to the invention is characterized by a press plunger for pressing the filling material at a dosed pressure from a press cylinder into the area of the board to be made denser or strengthened.

The drawing illustrates by way of example in:

FIG. 1 a plan view of a chip wood board treated according the invention and which will be used to produce a door.

FIG. 2 is on a larger scale a sectional view of the board, taken along the line II-II of FIG. 1, showing a door fitting or hinge plates on the board.

FIG. 3 is a partly sectional, schematic side view, of an example of the apparatus for carrying out the method according to the invention.

The chip wood board of FIG. 1 already treated according to the invention has at the one longitudinal edge two places 1 with increased density, these places serving for mounting a door lock and at the other longitudinal edge two places 2 with increased density for screwing fast hinge plates 3 (FIG. 2).

According to the use desired the chip wood board may have less than four, e.g. only one or more than four places of increased density. In order to replace solid timber strips along the edges of the board these edges may be treated according to the invention over their entire length to increase strength and density. Cases may occur, where the places of higher density are or not only provided along edges of the board, but also inside the edges within the surface of the board.

The installation as shown in FIG. 3 has a clamping plate 6 fixed to the rod 4 of a piston within a hydraulic or pneumatic cylinder 5. According to the dimensions of the chip wood board there may be provided more than one clamping plate 6, a separate cylinder 5 being associated to each clamping plate. The clamping plate 6 acts upon a side edge of the chip wood board 7 to be treated. The clamping plate 6 may, in another embodiment of the installation, be operable by tightening screws or the like. In order to avoid disruption or splitting of the board 7, holding members 11 act upon the upper and lower surfaces 8 and 9, respectively, within reach of the treating place 2. These holding members 11 may, for instance, be operable in a well-known manner hydraulically, pneumatically or by means of tightening screws or the like.

On the same frame 10 as the cylinder 5 also the equipment for feeding the filling or binding material is provided. This equipment consists of a hydraulic or pneumatic press cylinder 12 with a plunger 13 to the rod 14 of which a press plunger 16 movable to and fro in a binding agent cylinder 15 is fixed. On its end turned away from the press cylinder 12, the binding agent cylinder 15 has a projecting wall in the shape of a ring 17 the purpose of which will be described later on. A filling tube 18 for inserting the binding agent discharges into the cylinder 15. The inner wall surface of the cylinder 15 and the outer surface of the press plunger 16 preferably have, in dependence on the kind of the binding agent used, a coating, for instance, one known under the trademark "Teflon," in order to avoid adhering of binding agent to the parts 15 and 16.

The method according to the invention may, for instance, be carried out with the aid of the shown and described installation as follows:

In order to increase the density of the board 7 on one of the places 1 and 2, the board is brought into the position shown in FIG. 3. In this position the board 7 is held fast by the clamping plate 6, previously brought into working position by the piston of the cylinder 5, and by the two holding members 11. Under the influence of the pressure of the clamping plate 6 the ring 17 has penetrated into the chip wood board to prevent the pressure and the binding agent from laterally escaping towards the surface of the board. Now, through the tube 18 binding agent, for instance synthetic-resin cement is filled into the cylinder 15 in front of the press plunger 16 being in its rearmost dead point position. Filling-in the binding agent might also be carried out from a pressure tank or by means of a pump or with the aid of a pressure spray gun. Now the press plunger 16 is operated by means of the piston 13 and the binding agent or other filling material is pressed out of the cylinder 15 into the place or zone 2 of the chip wood board 7. The plunger 16 is preferably moved forward up to the edge of the chipboard 7. For increasing the density of the other desired places of board, the plate 6, the members 11 and the press plunger 16 are at first moved back from their operating position and after having displaced the board to treat another place of it, the members 6 and 11 are again brought into the position shown in FIG. 3 and the above described process of increasing the density can be carried out at the new place of the board. Preferably the clamping plate 6 is first brought into working position and the holding members 11 only afterwards.

In another embodiment, the installation may be constructed to allow increasing the density at all desired places of the board at the same time in one single working operation.

Either immediately or somewhat after the described process of pressing-in filling material, which has meanwhile associated with the chips of the board, the filling material is getting hardened, for instance, by leaving the board in the open air, by chemical reaction or heat supply, e.g. by contact or radiation heat or by high-frequency heating or by a combination of chemical and heat action. High-frequency hardening offers the advantage that it can easily be carried out in a continuous process and in that the tolerances of thickness can be kept in a very exact way. The chemical hardening of the filling material can, for instance, be obtained by adding a hardener, such as, e.g., ammonium chloride. The choice of the value, that is, the dosing of the pressure produced by the press plonger 16 depends on the density of the chip wood board to be treated and on the kind of the filling material. This value is to be determined by experiment.

By a suitable choice of the cross section of the press plunger 16 and of the cylinder 15 not only the size of the range to be increased in density can be chosen as need be, but also e.g. round, rectangular or places with increased density of any other shape can be obtained. This size and shape is determined by the kind and shape of the object to be screwed or fixed in any other way to the chip wood board and by the kind of use of the board.

If, before pressing the binding agent into the board, this agent is heated, e.g. to 200° to 250° C., also the installation parts 15, 16, 17 and 18 must be heated, for instance, by means of heating coils. Heating the binding agent and the said installation parts offers the advantage that no water will be introduced into the board, so that high-frequency or any other hardening treatment may be omitted, since the binding agent will harden simply by cooling down.

While I have shown and described some performances of my invention, I do not wish to restrict the scope of protection thereto, but reserve the right to make such modifications and rearrangements that may come within the purview of the appended claims.

I claim:

1. Apparatus for locally introducing a density-increasing fluid into selected areas of a porous wooden chip board to facilitate mounting of hardware or the like on said board by means of driven fasteners, comprising in combination:

power-operated clamp means for engaging one side of a workpiece being treated;

fluid injection means opposite said clamp means for engaging the workpiece in direct opposition to said clamp means, said fluid injection means comprising a cylinder having an uninterrupted axial outlet for juxtaposed direct engagement and communication with said workpiece, power-operated piston means in said cylinder for axial movement toward and away from said axial outlet, said cylinder including means for introducing a treatment fluid therein downstream of said piston whereby treatment fluid is directly and forcibly expressed into said workpiece by said piston, said outlet including an endless, axially-projecting sealing means circumposed about the margin of said cylinder outlet for penetrating the workpiece and defining the area being locally treated with pressurized treatment fluid; and auxiliary power-operated clamp means mounted for transverse movement relative to axial movement of said power-operated piston, said auxiliary clamp means being disposed on opposite sides of said sealing means and overlapping the same and projecting axially therebeyond for applying a restrictive pressure on opposite sides of the area being treated with pressurized fluid and preventing rupture of the porous workpiece when treatment fluid is pressure injected.

2. The apparatus as set forth in claim 1 in which said auxiliary clamp means comprise mutually parallel, planar surfaces for engaging opposite mutually parallel sides of a planar workpiece, said planar surfaces of said clamp means having one end in engagement with an end surface of said cylinder and overlapping the sealing means thereat.